(12) United States Patent
Fonseca, Jr. et al.

(10) Patent No.: US 8,243,639 B2
(45) Date of Patent: Aug. 14, 2012

(54) METHOD FOR CONTROLLING A WAKE UP RATE OF NODES OPERATING WITHIN A MULTI-HOP COMMUNICATION SYSTEM

(75) Inventors: Benedito J. Fonseca, Jr., Glen Ellyn, IL (US); Jeffrey D. Bonta, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1088 days.

(21) Appl. No.: 12/038,213

(22) Filed: Feb. 27, 2008

(65) Prior Publication Data

US 2009/0213821 A1 Aug. 27, 2009

(51) Int. Cl.
*G08C 17/00* (2006.01)
*H04B 1/00* (2006.01)

(52) U.S. Cl. ..... 370/311; 370/329; 370/338; 455/127.5; 455/343.4; 455/450; 455/574

(58) Field of Classification Search .......... 370/310–313, 370/321, 324, 328–329, 331, 335, 338, 350–351, 370/408, 465, 503, 252; 455/41.2–41.3, 455/41.7, 450, 452.1, 553.1, 556.2, 127.5, 455/343.2–343.4, 418–421, 550.1, 561, 574; 340/539.11, 539.22; 710/117, 124; 713/300–323
See application file for complete search history.

(56) References Cited

U.S. PATENT DOCUMENTS

| 6,735,417 | B2 | 5/2004 | Fonseca et al. | |
|---|---|---|---|---|
| 2002/0082060 | A1* | 6/2002 | Kang et al. ............ | 455/574 |
| 2005/0208966 | A1 | 9/2005 | David et al. | |
| 2006/0120303 | A1* | 6/2006 | Yarvis et al. ........... | 370/254 |
| 2006/0140135 | A1* | 6/2006 | Bonta et al. ........... | 370/254 |
| 2006/0209715 | A1* | 9/2006 | Kushalnagar et al. .... | 370/254 |
| 2007/0097895 | A1* | 5/2007 | Keshavarzian et al. ... | 370/311 |
| 2007/0165545 | A1* | 7/2007 | Dobrowski et al. ...... | 370/254 |

FOREIGN PATENT DOCUMENTS

| EP | 1223680 A2 | 7/2002 |
|---|---|---|
| WO | WO0247321 A3 | 6/2002 |
| WO | WO03098851 A1 | 11/2003 |
| WO | 2004007718 A2 | 9/2004 |
| WO | 2005050426 A1 | 6/2005 |

OTHER PUBLICATIONS

Ya Xu et al—"Topology Control Protocols to Conserve Energy in Wireless Ad Hoc Networks"; Jan. 2004—37pp.

(Continued)

*Primary Examiner* — Habte Mered
(74) *Attorney, Agent, or Firm* — Randi L. Karpinia

(57) ABSTRACT

A method is provided which enables the connection of nodes out of communication range while minimizing the energy consumption in standby nodes. Specifically, the present invention provides a method to control the wake up rate of standby nodes in a multi-hop communication system. An access point collects, processes, and refines statistical information regarding one or more system parameters; determines a wake up rate based on the statistical information and one or more historical information; and transmits the wake up rate to nodes in its coverage area. A node receives the wake up rate; and periodically changes from a sleep state to a wake up state at the wake up rate to support routing functions for providing multi-hop communication to the one or more access points.

17 Claims, 10 Drawing Sheets

OTHER PUBLICATIONS

Ya Xu et al—Adaptive Energy-Conserving routing for multihop ad hoc networks; Technical Report TR-2000-527, USC/Information Sciences Institute; 2000—14pp.

Alberto Cerpa et al—"ASCENT: adaptive self-configuring sensor networks topologies"; IEEE Trans. On Mobile Computing; Jul. 2004—10pp.

Benjie Chen, et al—"SPAN: An energy-efficient coordination algorithm for topology maintenance in ad hoc wireless networks"; ACM Wireless Networks, 8(5), 2001—12pp.

Wei Ye et al—"Medium Access Control with Coordinated Adaptive Sleeping for Wireless Sensor Networks"; IEEE/ACM Trans on Networking, vol. 12, No. 3, Jun. 2004, pp. 493-506.

Lu and others; "An adaptive energy-efficient and low-latency MAC for data gathering in wireless sensor networks"; Proc. 18th international parallel and distributed processing symposium, IEEE 2004—8pp.

Qing Cao et al—"Towards Optimal Sleep Scheduling in Sensor networks for Rare-Event Detection"—IEEE 2005—pp. 20-27.

Curt Schurgers et al—"STEM: Topology management for energy efficient sensor networks"; IEEE Aerospace Conference, Mar. 2002—pp. 3-1099-1-1100.

Peng Lin et al—"Medium Access Control With Dynamic Duty Cycle for Sensor Networks"; IEEE WCNC 2004—pp. 1534-1539.

C. Srisathapornphat and S. Chien-Chung—"Coordinated Energy Conservation for Ad Hoc Networks"; IEEE 2002—pp. 3330-3335.

PCT/US2009/034817—EPC International Search Report—Mailed Jul. 31, 2009—17 pages.

Sze-Yao, Ni et al., "The Broadcast Storm Problem in a Mobile Ad Hoc Network," IEE Conference on Mobile Computing, 1999, Mobicom, Seattle Washington USA, pp. 151-162.

Notice of allowance mailed on Dec. 16, 2011 in counterpart European Patent Application No. 09716105.

English language translation of KIPO'S Notice of Preliminary Rejection mailed on Jan. 13, 2012 in counterpart Korean Patent Application No. 10-2010-7018951.

International Preliminary Report on Patentability mailed on Sep. 10, 2010 for counterpart International Application No. PCT/US2009/034817.

* cited by examiner

METHOD FOR CONTROLLING A WAKE UP RATE OF NODES OPERATING WITHIN A MULTI-HOP COMMUNICATION SYSTEM

FIELD OF THE DISCLOSURE

The present disclosure relates generally to multi-hop communication systems and more particularly to controlling a wake up rate of nodes operating within a multi-hop communication system.

BACKGROUND

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "wireless device" or "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present that limits the radio transmission range between the nodes), the packets can be relayed via intermediate relay nodes ("multi-hopping") along a route until the packets reach the destination node. In such situations, each intermediate relay node routes the packets (e.g., data and control information) to the next node along the route, until the packets reach their final destination. For relaying packets to the next node, each node maintains routing information collected through communications with its neighboring nodes. The routing information can also be periodically broadcast in the network to reflect the current network topology. Alternatively, to reduce the amount of information transmitted for maintaining accurate routing information, the network nodes may exchange routing information only when it is needed. In many multi-hop ad hoc networks, multiple routes can be present between a source node and a destination node for communication of a particular data stream or "flow."

Many ad hoc networks include one or more access points. An access point (AP) is a device communicatively connected either directly (via a wired link) or indirectly (via a wireless link) to a wired network that enables remote wireless nodes to communicate with the wired network (e.g. local area network (LAN), wide area network (WAN), etc.). An AP connects wireless communication devices which are in its direct communication range (i.e. one-hop away) together to form a wireless network. In many cases, the AP connects to a wired network, and can relay data between wireless devices and wired devices. For example, an AP can be a cellular base station such as implemented within IEEE 802.16 networks. (See: http://standards.ieee.org/getieee802/index.html or contact the IEEE at IEEE, 445 Hoes Lane, PO Box 1331, Piscataway, N.J. 08855-1331, USA.) In one implementation, an AP can be a Mesh Access Point (MAP) which has meshing capability. A MAP is distinguishable from a regular AP in that an MAP implements a mesh routing protocol such as a Mesh Scalable Routing (MSR) protocol disclosed in U.S. Pat. No. 7,061,925 B2, to Avinash Joshi, entitled "System and Method for Decreasing Latency in Locating Routes Between Nodes in a Wireless Communication Network," its contents being incorporated by reference in its entirety herein. A MAP is also referred to as a "wireless device" or a "node". An Intelligent Access Point (IAP) is a special MAP which connects to a wide area wired network (WAN) and can relay data between the wireless devices and the wired devices on the WAN. IAPs and MAPs can enable communication between the wired network and remote wireless nodes which are multi-hop away through the MSR and its proxy routing variant as disclosed in United States Patent Application Publication Number 20060098612, to Joshi et al, entitled "System and method for associating different types of nodes with access point nodes in a wireless network to route data in the wireless network", and United States Patent Application Publication Number 20060098611, to Joshi et al, entitled "System and method for routing data between different types of nodes in a wireless network," the contents of each being incorporated by reference herein.

A powered-on node can be in one of two possible states: an active state or a standby state. A node is in an active state when it is the source or destination of application data packets being communicated within a network. For example, a node is in an active state when it is on a voice-over-internet protocol (VOIP) call. When a node is not in an active state and is powered-on, it is in a standby state. For example, a node that is operated by a human user is in a standby state whenever its human user is not communicating using the node.

Mobile nodes are generally powered by batteries with a finite amount of energy. Batteries need to be recharged or replaced whenever their energy is exhausted. In order to extend the time between re-charges, it is beneficial to limit the power consumption of a node. A node consumes energy from its battery whenever it is powered on. A node in the active state generally consumes more energy than a node in the standby state. A standby-time is defined as the time between two consecutive battery recharges when the node is in the standby state.

Multi-hop communications, in general, require the various nodes to relay information from a source node to an AP. Given that the multi-hop relaying may require the participation of nodes that are in a standby state, one concern is how such multi-hop communications reduce the standby-time of user devices.

In order to include nodes in the standby state in the formation of multi-hop routes, it is necessary that nodes in the standby state periodically wake up to monitor a channel in which a routing message or a message indicating a route message can be transmitted. Such channel will be referred in this application as a "wake up channel". The wake up channel may be a frequency channel, a period of time or time-slot, a specific spreading code or any combination of those that is specifically separated from the other channels for this purpose.

When a standby node wakes up in the wake up channel, other nodes may send a "remain awake" message in the wake up channel in order to request that node perform relay services to the AP or to other nodes within the network. When a standby node receives such "remain awake" messages, it remains awake for a period of time in order to exchange control messages to establish a final route to the destination.

The wake up channel may or may not be allocated at all times. For example, in systems employing a synchronous type of power save mode (PSM), the wake up channel is not allocated at all times; instead, it is allocated for just a period of time following the period in which system control information is transmitted in a beacon signal. Standby nodes wake up during a beacon period and a wake up period (the wake up channel); and, if they do not receive a "remain awake" message, they enter in a sleep state in between the end of the wake up period and the beginning of the next beacon. If standby nodes receive a "remain awake" message, they monitor other channels in which routing messages can be transmitted. A beacon is a unique message containing control information for the system. The beacon contains information such as synchronization information, paging information, network identification information, and the like. The purpose of the wake up channel is to allow active nodes to reach standby nodes to request relaying services. In other words, before a node sends a route discovery message to standby nodes, it requests that they remain awake by sending a "remain awake" message in the wake up channel.

While it is desirable to involve standby nodes in the formation of routes, it is also desirable to maximize the time in which a standby node is in the sleep state (i.e. to maximize its standby time). It is also desirable to minimize unnecessary activities in the standby node. Therefore, to balance all of these considerations, it is best to avoid standby nodes waking up when they are not needed and, when standby nodes are needed, it is necessary to provide a method to ensure that just the required quantity/subset of standby nodes wake up. Accordingly, there is a need for method and apparatus for controlling a wake up rate of nodes operating within a multi-hop communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
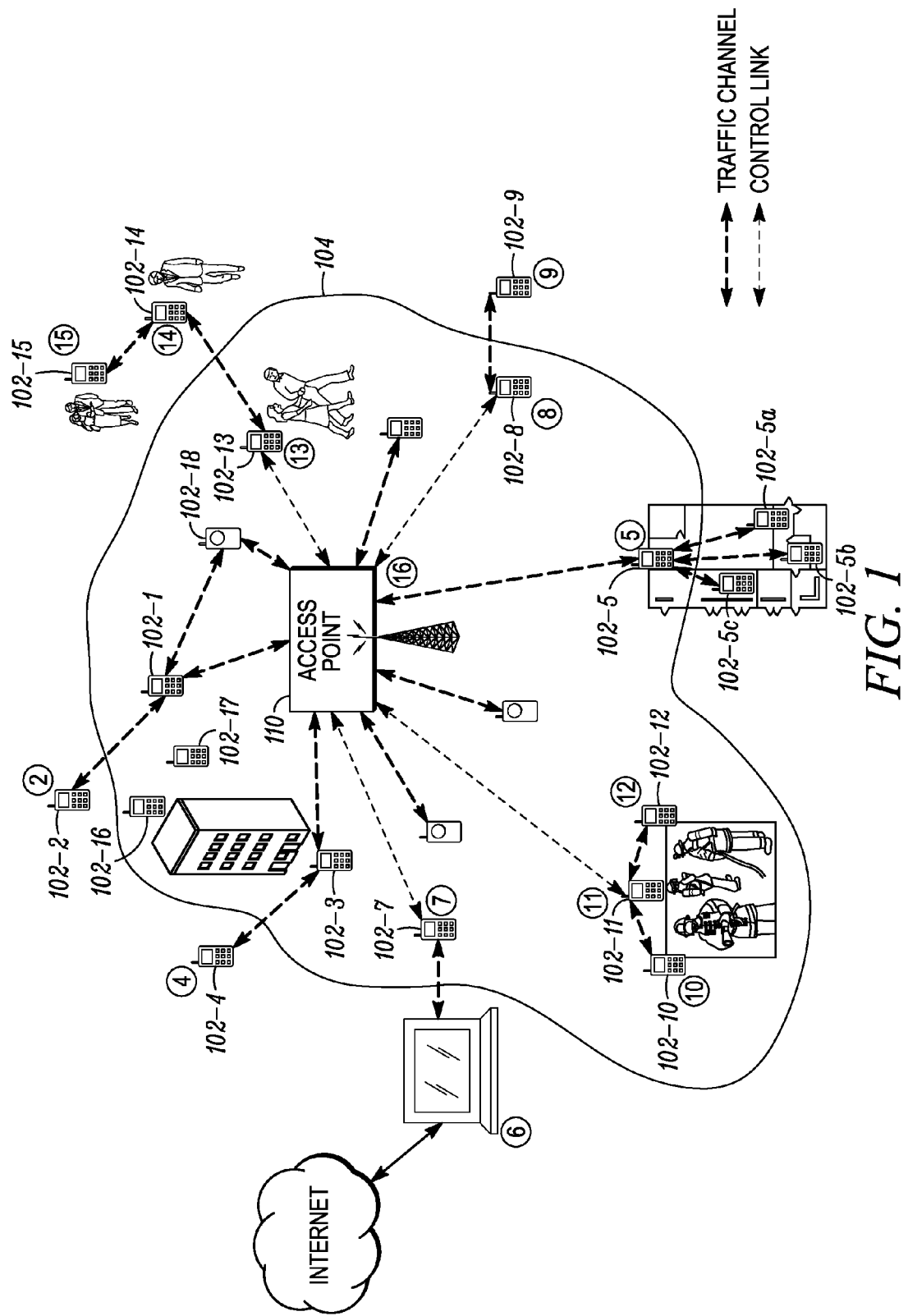
FIG. 1 is a block diagram of a wireless multi-hop communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention enables the communication connection of nodes within a multi-hop communication network while minimizing the energy consumption in standby nodes.

FIG. 1 is a block diagram of a wireless multi-hop communication network 100. It will be appreciated that the wireless multi-hop communication network 100 can be any ad hoc network including a mesh enabled architecture (MEA) network, an IEEE 802.11 network (i.e. 802.11a, 802.11b, 802.11g, 802.11e or 802.11s), a cellular-enabled network such as an IEEE 802.16 network, (see: http://standards.ieee-.org/getieee802/index.html or contact the IEEE at IEEE, 445 Hoes Lane, PO Box 1331, Piscataway, N.J. 08855-1331, USA), or any other packetized mesh communication network, or an equivalent.

As illustrated in FIG. 1, the wireless multi-hop communication network 100 includes a plurality of mobile nodes 102-1 through 102-n (referred to also as mesh nodes 102, mesh points 102, nodes 102, mobile nodes 102, or mobile communication devices 102). The wireless multi-hop communication network 100 provides an in-coverage contour 104 which is the area in which communication can directly reach the various participating nodes. At any given time, each of the mobile nodes 102 can be categorized as being an "in-coverage" node or an "out-of-coverage" node. If a node 102 is able to communicate directly with the AP, it is categorized as being "in-coverage"; otherwise, it is categorized as being "out-of-coverage". Examples of in-coverage nodes are 102-1, 102-3, 102-7, 102-8, 102-13, 102-16 and 102-17. A node 102 may become an out-of-coverage node in several situations, an out-of-coverage node may be far-located from the AP (for example, node 102-2 and 102-9), an out-of-coverage node may be shadowed (for example, node 102-4), and/or an out-of-coverage node may be in-building (for example, nodes 102-5a, 102-5b, and 102-5c). The approach to extending communication service to an out of coverage mobile node (for example, node 102-2) is through an in-coverage mobile node (for example, node 102-1).

Figure 2:
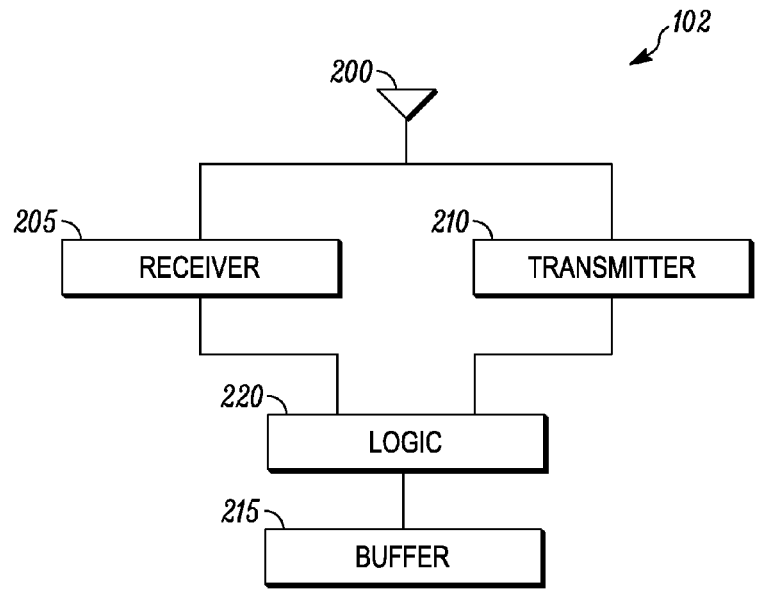
FIG. 2 is a block diagram of a mobile node for operation within the wireless multi-hop communication network of FIG. 1 in accordance with some embodiments.

FIG. 2 is a block diagram of a mobile node 102 for operation within the wireless multi-hop communication network 100 of FIG. 1. The node 102 comprises an antenna 200, a receiver 205, a transmitter 210, a buffer 215, and a logic block 220. Although not shown, the node 102 also can include an antenna switch, duplexer, circulator, or other highly isolative means (not shown) for intermittently providing information packets from the transmitter 210 to the antenna 200 and from the antenna 200 to the receiver 205. The node 102, for example, can be an integrated unit containing at least all the elements depicted in FIG. 2, as well as any other elements necessary for the node 102 to perform its particular functions. Alternatively, the node 102 can comprise a collection of appropriately interconnected units or devices, wherein such units or devices perform functions that are equivalent to the functions performed by the elements of the node 102. For example, the node 102 may comprise a laptop computer coupled to a wireless local area network (LAN) card.

The logic block 220 includes one or more microprocessors, microcontrollers, DSPs (digital signal processors), state machines, logic circuitry, or any other device or devices that process information based on operational or programming instructions. Such operational or programming instructions are stored in a program memory (not shown). The program memory may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the logic block 220 has one or more of its functions performed by a state machine or logic circuitry, the memory containing the corresponding operational instructions may be embedded within the state machine or logic circuitry. The operations performed by the logic block 220 and the rest of the node 102 are described in detail below.

The transmitter 210 and the receiver 205 enable the node 102 to communicate information packets to and acquire information packets from the other nodes. In this regard, the transmitter 210 and the receiver 205 include conventional circuitry to enable digital or analog transmissions over a wireless communication channel. The transmitter 210 and the receiver 205, in one embodiment, are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax (Worldwide Interoperability for Microwave Access), and the like)

The implementations of the transmitter 210 and the receiver 205 depend on the implementation of the node 102. For example, the transmitter 210 and the receiver 205 can be implemented as an appropriate wireless modem, or as conventional transmitting and receiving components of two-way wireless communication devices. In the event that the transmitter 210 and the receiver 205 are implemented as a wireless modem, the modem can be internal to the node 102 or insertable into the node 102 (e.g., embodied in a wireless radio frequency (RF) modem implemented on a Personal Computer Memory Card International Association (PCMCIA) card). For a wireless communication device, the transmitter 210 and the receiver 205 can be implemented as part of the wireless device hardware and software architecture in accordance with known techniques. Most, if not all, of the functions of the transmitter 210 and/or the receiver 205 may be implemented in the logic block 220 as well. However, the logic block 220, the transmitter 210, and the receiver 205 have been artificially partitioned herein to facilitate a better understanding.

The receiver 205 is designed to allow receiving of radio frequency (RF) signals from within at least one bandwidth and optionally more bandwidths, if the communications with the proximate device are in a frequency band other than that of the network communications. The receiver 205 may optionally comprise a first receiver and a second receiver, or one receiver designed to allow receiving within one or more bandwidths. The at least one transmitter 210 may be designed to allow transmitting to multiple devices on multiple frequency bands. As with the receiver 205, dual transmitters 220 may optionally be employed where one transmitter is for the transmission to a proximate node or direct link establishment to WLAN's and the other transmitter is for transmission to a cellular base station. Dual receivers 205 and dual transmitters 220 may optionally be employed where one transmitter and one receiver is for transmission and reception of control channel information in one frequency band and the other transmitter and the other receiver is for transmission and reception of data channel information in a separate frequency band.

The antenna 200 comprises any known or developed structure for radiating and receiving electromagnetic energy in the frequency range containing the wireless carrier frequencies.

The buffer 215 may be any form of volatile memory, such as RAM, and is used for temporarily storing received information packets in accordance with the present invention.

Figure 3:
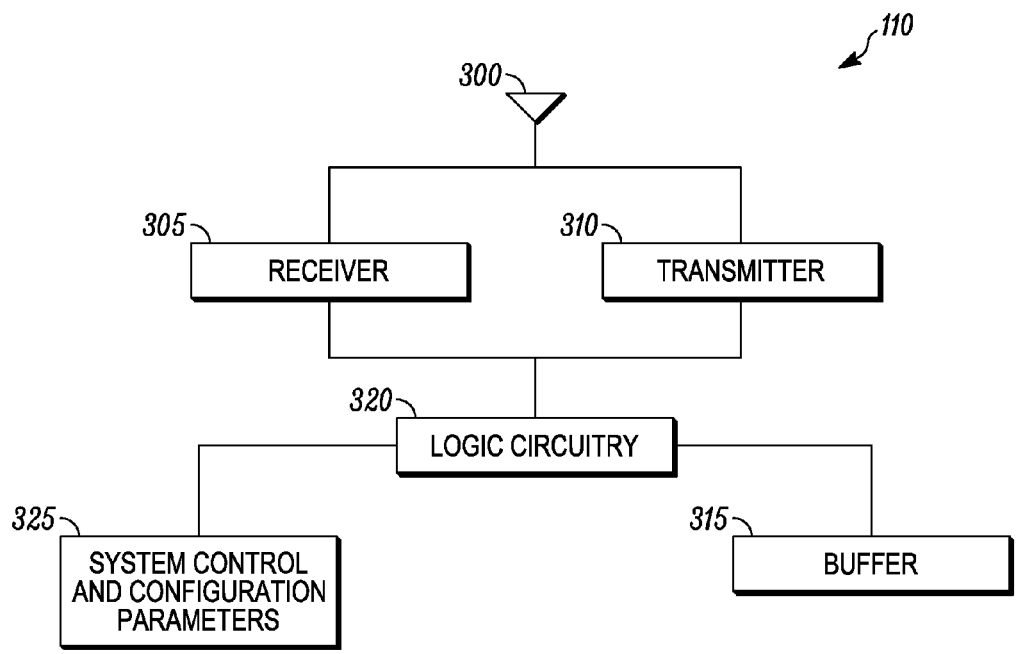
FIG. 3 is a block diagram illustrating an access point for operation within the multi-hop communication network of FIG. 1 in accordance with some embodiments.

The wireless multi-hop communication network 100 further includes one or more access points (APs) 110. FIG. 3 is a block diagram illustrating an access point 110 for operation within the multi-hop communication network 100. The access point 110 comprises an antenna 300, a receiver 305, a transmitter 310, a buffer 315, a logic circuitry 320, and a system control and configuration parameters memory 325. Although not shown, the access point 110 also can include an antenna switch, duplexer, circulator, or other highly isolative means (not shown) for intermittently providing information packets from the transmitter 310 to the antenna 300 and from the antenna 300 to the receiver 305. The access point 110, for example, can be an integrated unit containing at least all the elements depicted in FIG. 3, as well as any other elements necessary for the access point 110 to perform its particular functions. Alternatively, the access point 110 can comprise a collection of appropriately interconnected units or devices, wherein such units or devices perform functions that are equivalent to the functions performed by the elements of the access point 110. For example, the access point 110 may comprise a laptop computer coupled to a wireless local area network (LAN) card.

The antenna 300, the receiver 305, the transmitter 310, the buffer 315, and the logic circuitry 320, each operate similarly to their counterparts antenna 200, receiver 205, transmitter 210, buffer 215, and logic block 220 as discussed previously herein with regards to similar blocks of the node 102 in FIG. 2. For the sake of simplicity, the operation will not be re-stated here.

The access point 110 further comprises a system control and configuration parameters memory 325. The a system control and configuration parameters memory 325 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information.

In multi-hop communications networks such as that of FIG. 1, for example in multi-hop wireless local area networks (m-WLANs), access points (APs) 110 can be reached either through single or multiple hops. In sparse deployments, the capability of multi-hop communication extends the coverage area of the access points 110. Further, WLAN deployments normally do not involve the amount of necessary pre-planning to ensure full coverage. The addition of multi-hop communications can aid in the covering of such eventual out-of-coverage areas. It will be appreciated that multi-hop communications can only be possible if other nodes relay the information from the source node to the AP. Given that the relay operation may include the participation of nodes 102 even when they are in the standby state, one concern is how such multi-hop communications could reduce the standby-time of the various communication devices within the network.

Considering a synchronous communication system, such as an 802.16 system or an 802.11 system with beacon transmissions, standby nodes wake up during a beacon period and a "wake up" period (wake up channel) and return to sleep in between the end of the wake up period and the beginning of the next beacon if it is not required that the node remains awake. The term "wake up" is used to represent the sequence of actions that a standby node performs to turn on its radio transceiver and monitor communication channels, such as the channels carrying beacons and the wake up channel. The term "sleep" represents the action that a standby node performs to turn off its radio transceiver while maintaining other circuitry operational. The purpose of the wake up channel is to allow active nodes to reach standby nodes to request relaying services. In other words, before a node sends a route discovery message to standby nodes, it requests them to remain awake by sending a "remain awake" message in the wake up channel. (Note: the wake up channel is similar to the Announcement Traffic Indication Message (ATIM) window in the 802.11 context.)

When a standby node wakes up in the wake up channel, other nodes may send a "remain awake" message in the wake up channel in order to request that node to perform relay services. When a standby node receives such "remain awake" messages, it remains awake for a period of time and monitor other channels in order to exchange control messages to establish a final route to the destination.

It is desirable to maximize the time in which a standby node is in the sleep state (i.e. to maximize its standby time) while minimizing unnecessary activities in the standby node. To better illustrate this point consider the following example: consider a node 102-2 that wants to communicate with Access Point 110 but is out of range of AP 110. Referring to FIG. 1, considering that nodes 102-1, 102-16 and 102-17 are in range of AP 110 and in range of node 102-2, any of them can in principle be a relay to the packets between 102-2 and AP 110. Assume for this example that nodes 102-1, 102-16 and 102-17 are in the standby state and assume that they all monitor the next wake up channel allocation. Since node 102-2 needs to find a route to AP 110, it sends a broadcast "remain awake" message in the next wake up channel allocation. All of 102-1, 102-16 and 102-17 nodes receive the "remain awake" message and remain awake to monitor other channels in which node 102-2 broadcasts a route request message that is received by all of 102-1, 102-16 and 102-17 nodes. All 102-1, 102-16 and 102-17 nodes then are required to forward the broadcast message. Considering that just one of the nodes will be chosen for the final route, and assuming that the quality of the route would be approximately the same if any of the nodes perform the relay operation, it can be said that the energy consumed in the other two devices was wasted since they were not chosen for the final route. Ideally, just one of the three nodes needs to monitor the wake up channel to receive the "remain awake" message and participate in the route discovery and setup.

Similarly, node 102-2 may want to communicate with a node 102-18 that is out of communication range of 102-2, but the set of nodes {102-1, 102-16 and 102-17} is in range of 102-18 and in range of 102-2 and can therefore be a relay to the packets between 102-2 and 102-18. Again, just one of the three nodes would need to monitor the wake up channel to receive the "remain awake" message to participate in route discovery and setup between nodes 102-2 and 102-18.

In summary, the present invention enables the connection of nodes out of communication range while minimizing the energy consumption in standby nodes. Specifically, the present invention provides a method to control the wake up rate of standby nodes in a m-WLAN system. Note it is assumed that the battery-powered nodes may be required to periodically wake up to provide connectivity between nodes that are out of communication range.

The present invention is based on synchronous communication systems in which a standby nodes wake up on predetermined points in time only to receive a beacon (e.g. control information) and the wake up channel information. The Distributed Coordination Function (DCF) mode of 802.11 and its beacon generation procedure followed by the ATIM window and the 802.16m system are examples of such a communication system. When an active node desires to send a broadcast message for route discovery (or for any other purpose), it first sends a "remain awake" message in the wake up channel, which would cause standby nodes to remain awake to receive the broadcast message and participate in the route discovery procedure.

In order to maximize the standby-time of standby nodes, it is necessary that just the minimum necessary number of standby nodes wake up to satisfy a given connectivity criteria. For example, the number of standby nodes that wake up to establish or repair a route may be the minimum number that provides a high probability that a route is established in less than twelve seconds and a route is repaired in less than six seconds.

It will be appreciated by those of ordinary skill in the art that the amount of standby nodes that are required to enable the formation and maintenance of routes varies with system parameters such as: density of active nodes, density of standby nodes, percentage of out of coverage area, call generation rates and call duration statistics, and the like. Therefore, a standby node may not need to monitor the wake up channel whenever the wake up channel is allocated if the connectivity requirements are satisfied by other nodes. This situation is common when the density of nodes is high. With the methodology present in this application, the rate in which a standby node monitors the wake up channel is determined by the current system parameters.

Figure 4:
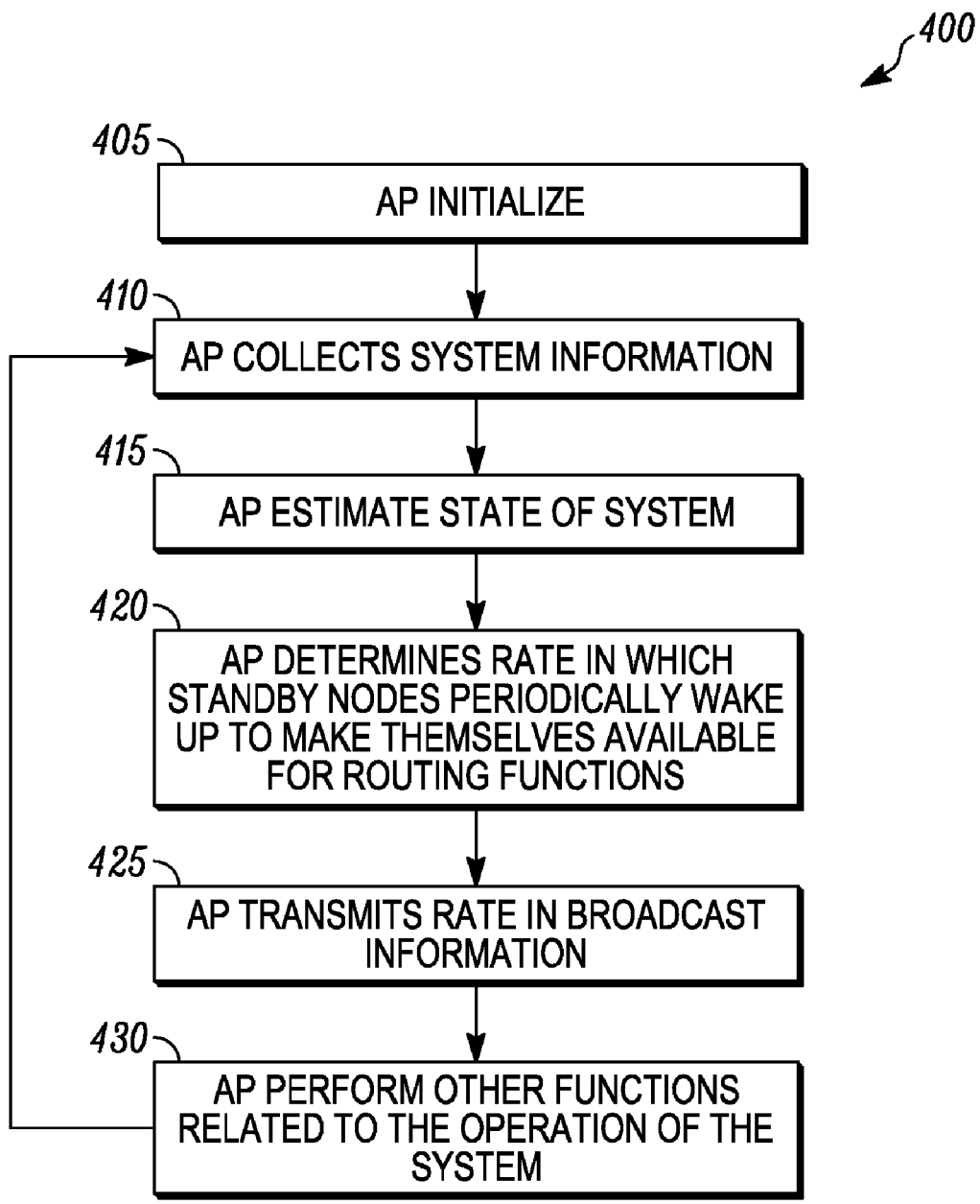
FIG. 4 is a flowchart illustrating a general method of operation of an access point within a wireless multi-hop communication network in accordance with some embodiments.

FIG. 4 is a flowchart illustrating a general method of operation 400 of an access point within a wireless multi-hop communication network in accordance with some embodiments of the present invention. As illustrated, the method begins with Step 405 in which the access point initializes. Next, in Step 410, the access point collects system information. Next in Step 415, the access point estimates the state of the system. The state of the system can include, but is not limited to, density of standby nodes, density of active nodes, a metric representing node mobility, and percentage of nodes that are out of communication range of the access point. Next in Step 420, the access point determines the rate in which standby nodes periodically wake up to make themselves available to perform routing functions (i.e. the rate in which nodes monitor the wake up channel). Next in Step 425, the access point transmits the determined wake-up rate in beacon frames broadcasted in the system. It will be appreciated that the standby nodes will thereafter wake up to monitor the wake up channel in the rate indicated in the beacons. Next in Step 430, the access point performs other functions relating to the operation of the system. The operation then cycles back to Step 410 with system information collection. In one embodiment, the access point is a MAP which may or may not be a mobile node.

Figure 5:
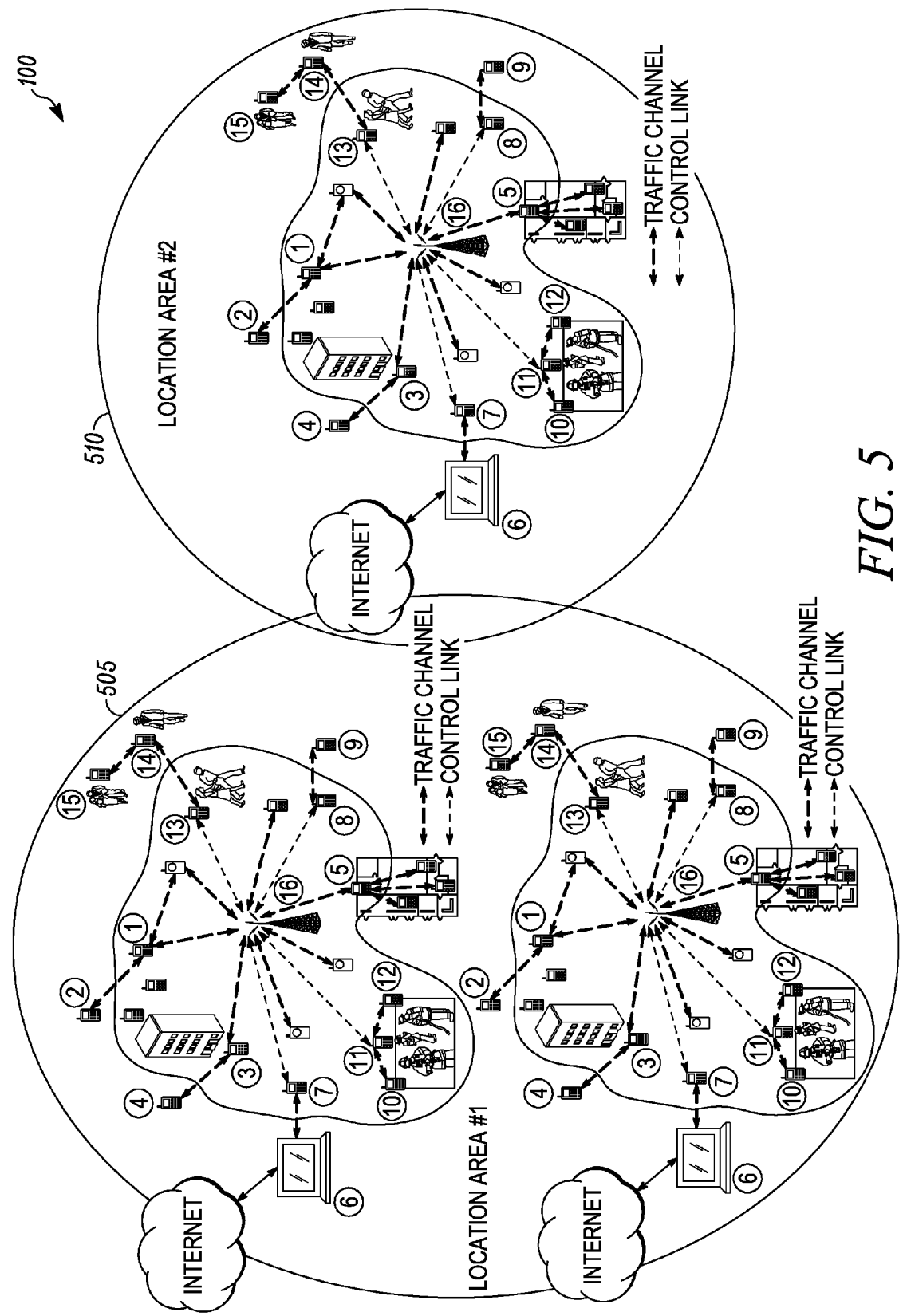
FIG. 5 is a block diagram illustrating the multi-hop communication network of FIG. 1 divided into a plurality of location areas in accordance with some embodiments.

FIG. 5 is a block diagram illustrating a multi-hop communication network, such as the multi-hop communication network 100 of FIG. 1, divided into a plurality of location areas in accordance with some embodiments of the present invention. Specifically, the service area for the multi-hop communication network 100 is divided into a first location area 505 and a second location area 510, which are defined to be the elements of a partition of the service area. Location Areas are defined to be large enough to contain at least one access point, but should generally contain several access points. The group of access points forming a Location Area can be determined either through a traditional pre-planning procedure or through an ad hoc manner, in which access points would communicate among themselves to determine the Location Areas. It will be appreciated that the connection among access points can be either wireless or wired. For the present example, it is assumed that all access points of the system are able to communicate with any other through wired (internet) connections. The Location Area includes areas that are not in direct communication range of access points.

In one embodiment, in order to improve the estimate of the number of standby nodes in an area, the area of Location Areas could be reduced to encompass a single AP.

In another embodiment, a hybrid of Location Areas can be implemented, in which slow moving or stationary Standby nodes would always register with the closest AP or MAP, and fast moving nodes would consider larger Location Areas.

Figure 6:
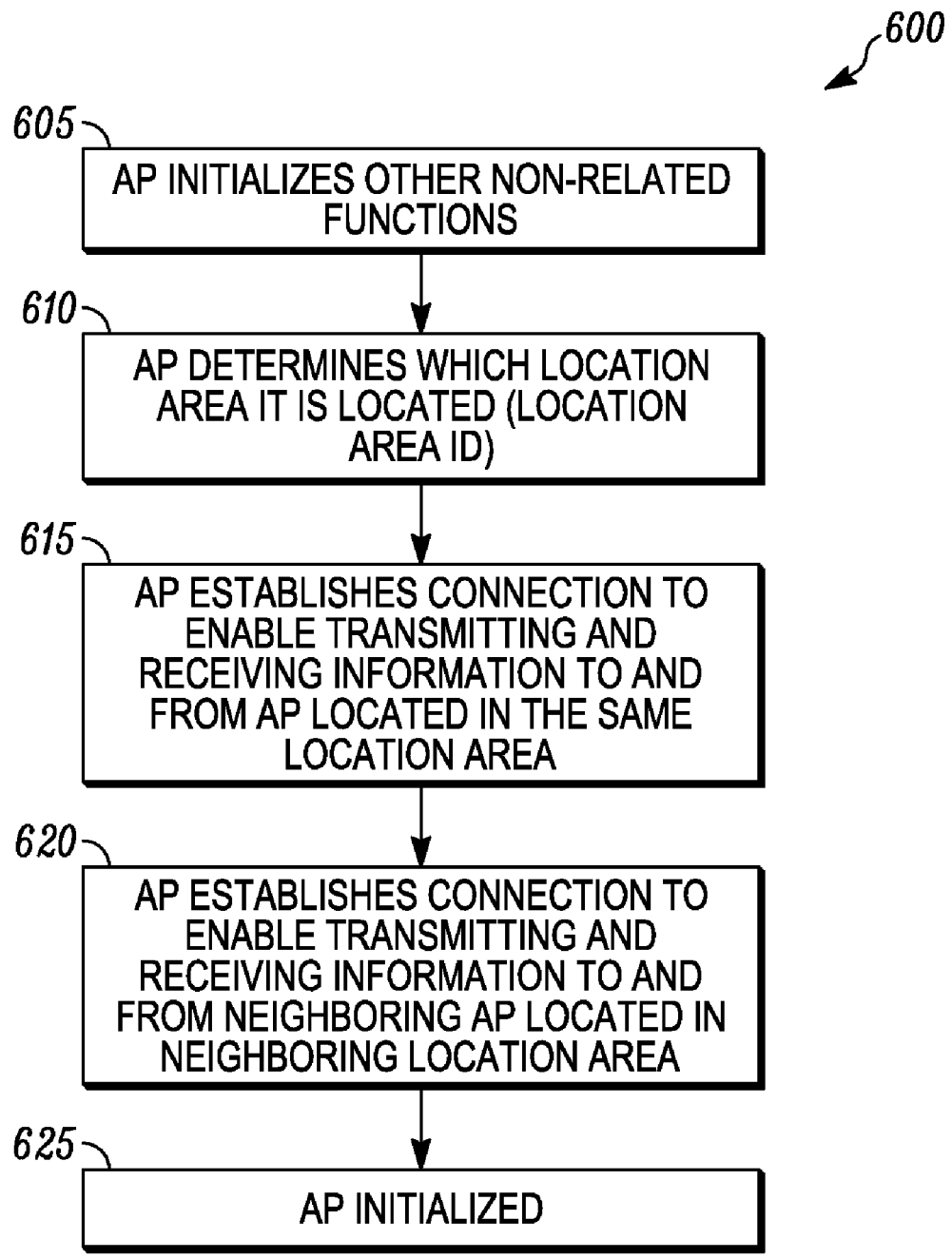
FIG. 6 is a flowchart illustrating further detail of the operation of an access point within a wireless multihop communication network in accordance with some embodiments.

FIG. 6 is a flowchart illustrating further detail of the operation 600 of an access point in accordance with some embodiments of the present invention. Specifically, the operation 600 is more detail of Step 405, access point initialization, of FIG. 4 in conjunction with the network diagram of FIG. 5. As illustrated, the operation begins with Step 605 in which the access point initializes all non-related functions. Next, in Step 610, the access point determines in which location area it is located (Location Area ID). In accordance with the present invention, APs are informed of their Location Area identification (LAID) as in traditional cellular systems. The LAID information is transmitted in each and every beacon transmitted in the Location Area, regardless if the beacon is transmitted by an Active or a Standby node. Each node stores the LAID of the Location Area in which it believes it is located.

Next, in Step 615, the access point establishes connection to enable transmitting and receiving information to and from a base station located in the same Location Area. Next, in Step 620, the access point establishes connection to enable transmitting and receiving information to and from a neighboring base station located in a neighboring location area. Lastly, in Step 625, the access point is initialized.

Figure 7:
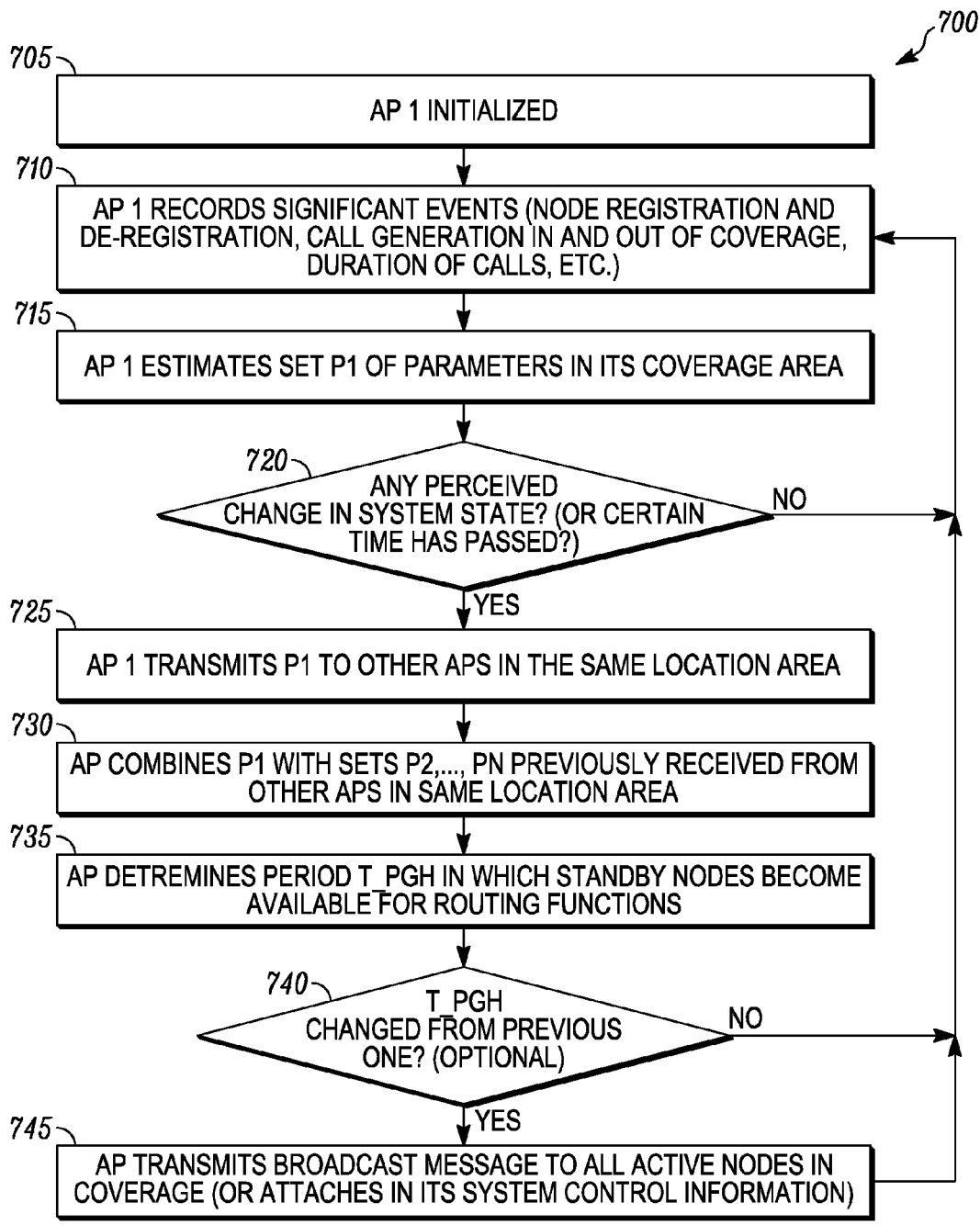
FIG. 7 is a flowchart illustrating further details of the operation of an access point within a wireless multihop communication network in accordance with some embodiments.

FIG. 7 is a flowchart illustrating further details of the operation 700 of the access point in accordance with some embodiments of the present invention. Specifically, FIG. 7 is further detail of the operation of FIG. 4. As illustrated in FIG. 7, the operation 700 begins with Step 705 in which an access point AP1 initializes. Next, in Step 710, the access point AP1 records significant events. Significant events can include, but are not limited to, node registration and de-registration, call generation in and out of coverage, duration of calls, and the like. Next, in Step 715, the access point estimates a set P1 of parameters in its coverage area. The set P1 includes, for example, density of standby nodes, density of active nodes, a measure of node mobility, percentage of nodes that are out of communication range of the access point, call generation rate, average call duration, percentage of failed call generations and repairs in out of coverage regions, and the like.

In accordance with the present invention, during Step 715 of FIG. 7, the access point continuously estimates the percentage of nodes in the Location Area that is out of direct AP coverage (P_out). Such estimation is done based on averages performed over long periods of time. An estimation method is described below but other methods can be envisioned.

At the origination of each flow, the AP considers whether the originator is in or out of direct AP coverage (originations that are being forwarded by relay nodes are generally originations from out of coverage nodes). Let $Y\_i=0$ or 1 represent whether the originator node is in or out of direct AP coverage. The AP estimates the probability of a node being out of direct coverage by averaging the last N $Y\_i$ values. (P_out=[Y_i+ Y_(i-1)+ . . . +Y_(i-N+1)]/N) It will be appreciated by those of ordinary skill in the art that the estimation of P_out could be aided by prior information from historical database or during installation.

Further in Step 715, Each AP generates estimates for the call generation rate ($\lambda$), the average call duration ($\mu$) and the route repair rate ($\gamma$). These estimates can be generated from historical information; for example, AP1 would store how many flows involving AP1 were generated, how many flows needed repair and the duration of the flows during the previous hours and/or during each hour of each day of the week for the past few weeks in order to generate the estimates. It will be appreciated that the route repair rate is correlated with node mobility.

Next, in Step 720, the access point determines whether there is any perceived change in system state or alternatively whether a predetermined period of time has passed. When neither has occurred, the operations cycles back to Step 710. When the access point determines that there is any perceived change in system state or alternatively a predetermined period of time has passed, the operation continues to Step 725 in which the access point AP1 transmits the P1 set of parameters to other APs in the same location area. Next, in Step 730, each access point receiving P1 from AP1 combines P1 with other sets P2, . . . , Pn previously received from other APs in the same location area. Next, in Step 735, each access point determines period T_PGH in which standby nodes are to become available for routing functions.

Whenever an AP receives a registration message (i.e. Step 710), for example, it informs other APs of the Location Area and also one of the APs of the previous Location Area of the registering node (i.e. Step 725). This allows the APs of the Location Area to have an estimate of the number of standby nodes inside a Location Area. APs then generate an estimate for the number of standby nodes N_stby inside their portion of the location area by dividing the overall estimate by the number of APs in the Location Area. (i.e. Steps 730 and 735)

It will be appreciated that the access point may be a MAP which may or may not be a mobile node. Alternatively, some or all nodes subordinate to an access point may be a MAP. Therefore, in the same way as APs, individual MAPs may receive the same information shared between APs to generate an estimate for the number of standby nodes N_stby inside their portion of the location area. Then, at the origination of each flow between MAPs, the MAP considers whether the originator is in or out of its coverage.

In an alternative embodiment, in areas in which the operator knows that the node density would be uniform, APs in a Location Area could communicate with APs in neighboring Location Areas in order to average its internal average with their estimates in order to refine the estimate.

In another alternative embodiment, in areas with more non-uniform node density, an AP would use its own count of active nodes in order to properly weight the estimate for the number of standby nodes in its area; for example, in a 4-AP Location Area, if an AP has 50% of the total active nodes in the Location Area, it would consider that 50% of the total standby nodes inside the Location Area would be inside its portion of the location area.

In a further alternative embodiment, active nodes would record the identity of standby nodes that transmit routing related messages during routing discovery procedures and would communicate their identities to the AP, which would refine its estimate.

In a further alternative embodiment, the estimate of number of standby nodes inside the Location Area or inside the AP coverage region would be refined by prior or historical information; for example, an AP can be programmed to consider that a minimum number of standby nodes are expected in its coverage region for each time of the day of the week. Also, an AP can store standby node count estimates and use them to refine future estimates.

Further expanding Step 735, Each AP counts the number N_act of active (including relay) nodes that are involved in its flows and share with the other APs of its Location Area. Each AP, in accordance with some embodiments, is equipped with a lookup table or analytical formula that, given the estimates for percentage of out of coverage nodes (P_out), number of standby and active nodes (N_stby and N_act), call generation rate, flow repair rate and average flow duration ($\lambda$, $\gamma$ and $\mu$), would determine which T_PGH to use.

In accordance with some embodiments, the lookup table is initially filled out based on simulation studies or analytical work. In an alternative embodiment, the values on the lookup table are adjusted as time passes based on collected statistics of percentage of failed call setups and failed call repairs. For example, if the percentage of failed call setups/repairs were higher than specified, the T_PGH values of the table would be reduced, making it more conservative, and vice versa. Minimum and maximum ranges for T_PGH at each set of parameters could be established in the lookup tables in order to guarantee the stability of the adaptation procedure.

Next, in Step 740, each access point optionally determines whether T_PGH has changed from a previous T_PGH. If it has not changed, the operation cycles back to Step 710. Whenever the AP decides to change its T_PGH, it would send a control message to be broadcasted among all active (including relay) nodes involved in flows that end in the AP. All active/relay nodes would update their T_PGH and would use it in eventual transmissions of Beacons. As illustrated in FIG. 7, if it has changed, or Step 740 is optionally not carried out, the operation continues to Step 745 in which each AP transmits a broadcast message to all active nodes in coverage (or alternatively attaches the information in its system control information). The operation then cycles back to Step 710.

Figure 8:
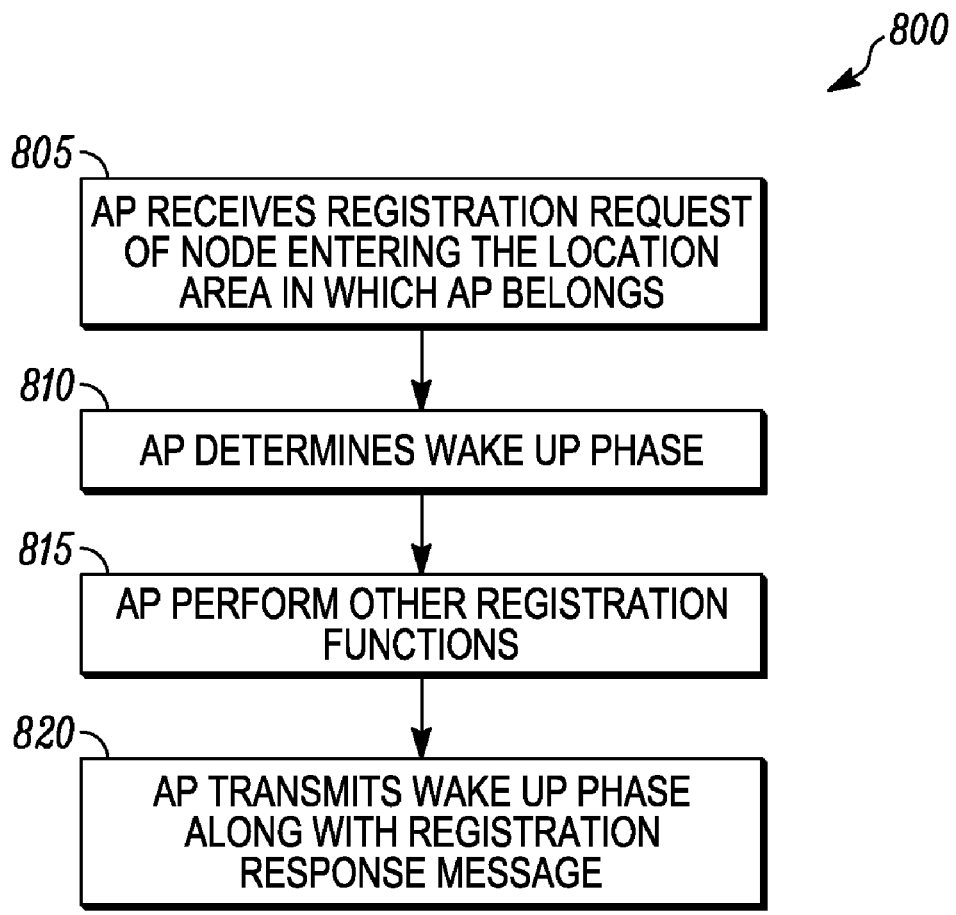
FIG. 8 is a flowchart illustrating further details of the operation 800 of an access point within a wireless multihop communication network in accordance with some embodiments.

FIG. 8 is a flowchart illustrating further details of the operation 800 of an access point within a wireless multihop communication network. Specifically, FIG. 8 illustrates the operation of an access point in processing a registration request from a node entering the location area in which the access point belongs. As illustrated, the operation 800 begins with Step 805, in which an access points receives a registration request of a node entering the location area in which the access point belongs. Next, in Step 810, the access point determines a wake up phase. Next, in Step 815, the access point performs other registration functions. Next, in Step 820, the access point transmits the determined wake up phase along with a Registration Response message.

Figure 9:
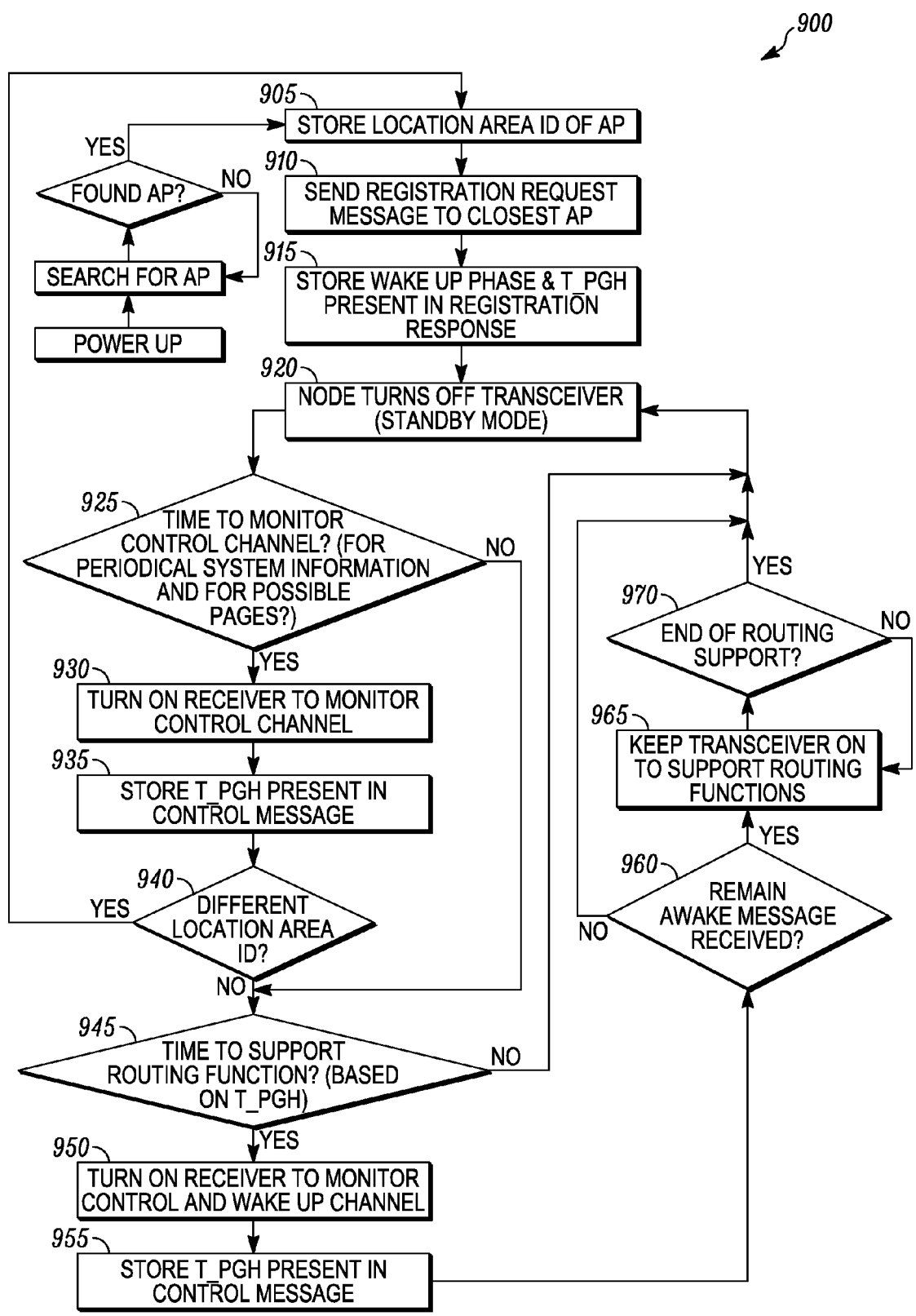
FIG. 9 is a flowchart illustrating the operation 900 of a node within a wireless multihop communication network in accordance with some embodiments.

FIG. 9 is a flowchart illustrating the operation 900 of a node within a wireless multihop communication network in accordance with some embodiments of the present invention.

As illustrated, the operation begins with Step 905 in which the node stores the location area identification of an access point. Next, in Step 910, the node sends a registration request message to the closest access point.

In one embodiment nodes could register frequently with the APs and, in order to limit the amount of energy consumption in registrations, the rate in which a node registers with a AP would be limited to T_{Register} seconds. Nodes would only consider re-registering after T_{Register} seconds and if the node finds itself in the coverage of a different AP. The parameter T_{Register} can also be made variable and imposed by the APs in a Location Area. Note that this second method is an indirect way of implementing different Location Area sizes for nodes at different speeds.

Further explaining Steps 905 and 910, whenever a node notices a change in its Location Area Identification (LAID) information, it performs registration with the Location Area by establishing a connection with the closest AP and registering with it. This procedure is very similar to the one used in cellular systems and ensures that APs have an estimate regarding the total number of nodes inside its Location Area. A node processes the LAID information in a beacon as follows: if the beacon is received from an Active Node, it will update its LAID information; however, if the beacon is received from a Standby node, it only updates its LAID information if the last N_{LAID} beacons contained the same LAID information; otherwise, it disregards the information. The reason for this is the following: imagine that a Standby node moves from Location Area LA1 to Location Area LA2 and transmits a beacon before receiving a beacon with the new Location Area information. Standby nodes in LA2 would then erroneously update their LAID. With this 'filter', the Standby nodes in LA2 would wait for further beacons to update their LAID information. Given that the new node from LA1 will probably not send a beacon before several of its neighbors do, nodes in LA2 will not update their LAID information and the new node from LA1 would end up updating its information.

Next, in Step 915, the node stores the wake up phase and T_PGH present in the registration response received from the access point. During registration, the standby node is informed of its "wake up phase" by the AP. The wake up phase is a number between 0 and 1 which is used by the standby node to determine which wake up channel allocation it should monitor out of T_PGH allocations of the wake up channel.

For example, assume that the AP (or APs) decides that the density of nodes is high enough such that standby nodes are required to monitor the wake up channel once every 20 allocations of the wake up channel (T_PGH=20). A standby node joining the Location Area and receiving a wake up phase equal to 0.6 would monitor the 12th allocation of the wake up channel out of 20 allocations (floor(0.6×20)=12). During the registration, the node would also be told the number of the current allocation of the wake up channel in order to ensure that it knows when the 12th allocation of the wake up channel comes along. This method ensures that the AP is able to evenly distribute standby nodes among the wake up channel allocations. Note also that the distribution remains uniform in case T_PGH changes. On the example, suppose now that, after its registration, the APs in the Location Area notice a change in node density and the AP decides to change its T_PGH to T_PGH=10. The standby node would notice the new T_PGH and would start monitoring the 6th wake up channel allocation (floor(0.6×10)=6) out of every 10 allocations.

Next, in Step 920, the node turns off its transceiver and enters standby mode operation. Next, in Step 925, the node determines whether it is time to monitor the control channel for periodical system information and possible pages. When it is time to monitor the control channel, in Step 930, the node turns on its receiver to monitor its control channel.

In accordance with the present invention, standby nodes do not monitor all wake up channel allocations and are allowed to monitor just one out of T_PGH wake up channel allocations. For example, in one embodiment, nodes determine which wake up channel allocation to monitor following a deterministic pattern; for example, assuming T_PGH=20, a node N1 that monitors the 5th wake up channel allocation would subsequently monitor the 25th, the 45th, etc wake up channel allocations. On an alternative embodiment, a node may probabilistically monitor a wake up channel allocation with probability given by 1/T_PGH. The value that the node uses for the T_PGH is determined based on the T_PGH valued indicated in a field on the Beacon Medium Access Control (MAC) header.

Next, in Step 935, the node stores T_PGH present in control messages received. Whenever a standby node receives a Beacon, it extracts the T_PGH information and processes it as follows: a) if the Beacon was transmitted by an active/relay node, the standby node updates its T_PGH with the new one received in the Beacon. b) if the Beacon was transmitted by a standby node, the standby node would average the new T_PGH value with previously received ones (alternatively with weighting functions).

Next, in Step 940, the node determines if the access point has a different location area identification. When the location area identification has changed, the operation cycles back to Step 905. When the location area identification has not changed, and when, in Step 925, it is not time to monitor the control channel, the operation moves to Step 945 in which the node determines whether it is time to wake up to support a routing function based on T_PGH. When it is not time to wake up to support a routing function, the operation cycles back to Step 920. When it is time to wake up to support a routing function, the operation continues to Step 950 in which the node turns on or leaves on its receiver to monitor the control and wake up channel. Next, in Step 955, the node monitors the T_PGH present in control messages and, if different than the T_PGH previously stored, the node updates the T_PGH value. Next, in Step 960, the node determines whether or not a "remain awake" message has been received. When no "remain awake" message has been received, the operation cycles back to Step 920. When a "remain awake" message has been received, the operation continues to Step 965 in which the node keeps its transceiver on for a deterministic or random period of time to support routing functions. Next, in Step 970, the node determines whether routing support has ended. When it has not ended, the operation cycles back to Step 965. When the routing support has ended, the operation cycles back to Step 920.

In an alternative embodiment, two values for T_PGH would be considered: a T_PGH_high to be used whenever a standby node finds himself in an area without active flows; and a T_PGH_low to be used whenever a standby node finds himself in an area with active flows in which it could be considered for route repair. In such alternative embodiment, APs would have lookup tables with two values for T_PGH. Any beacon transmitted would then contain both values of T_PGH high and T_PGH_low to standby nodes and standby nodes would store and switch between the 2 values for T_PGH depending whether they are in reach or not an active node. The reason behind this alternative embodiment is that the connectivity requirements for the establishment of a new route is less strict (in terms of time to establish the route) than the connectivity requirements for the repair of an ongoing route.

Figure 10:
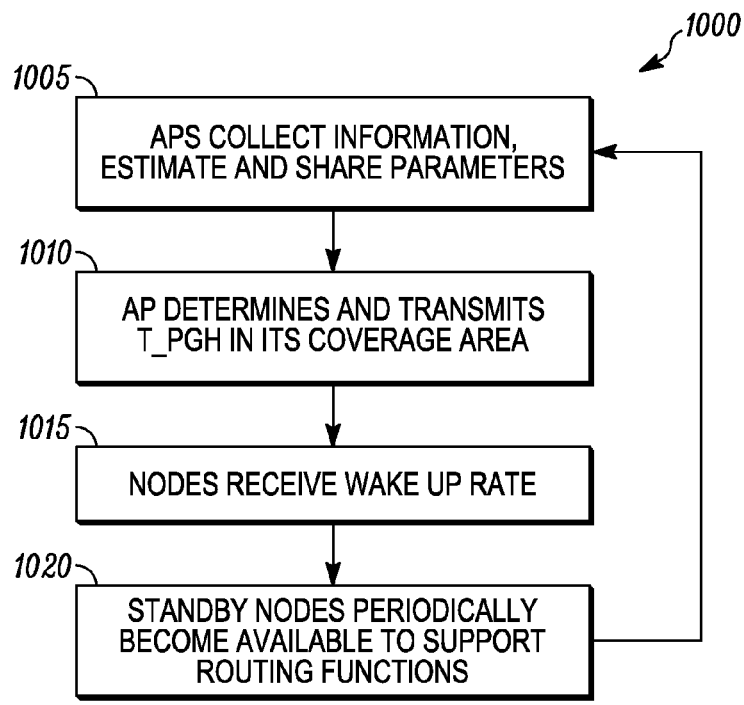
FIG. 10 is a flowchart of the overall system operation of a wireless multihop communication network in accordance with some embodiments.

To summarize, FIG. 10 is a flowchart of the overall system operation 1000 in accordance with some embodiments. As illustrated, the operation begins with Step 1005 in which the access points collect information, estimate, and share parameters. Next, in Step 1010, each access point determines and transmits T_PGH in its coverage area. Next, in Step 1015, each node receives the wake up rate. Next, in Step 1020, standby nodes periodically become available to support routing functions. This system operation is cyclical as illustrated.

Figure 11:
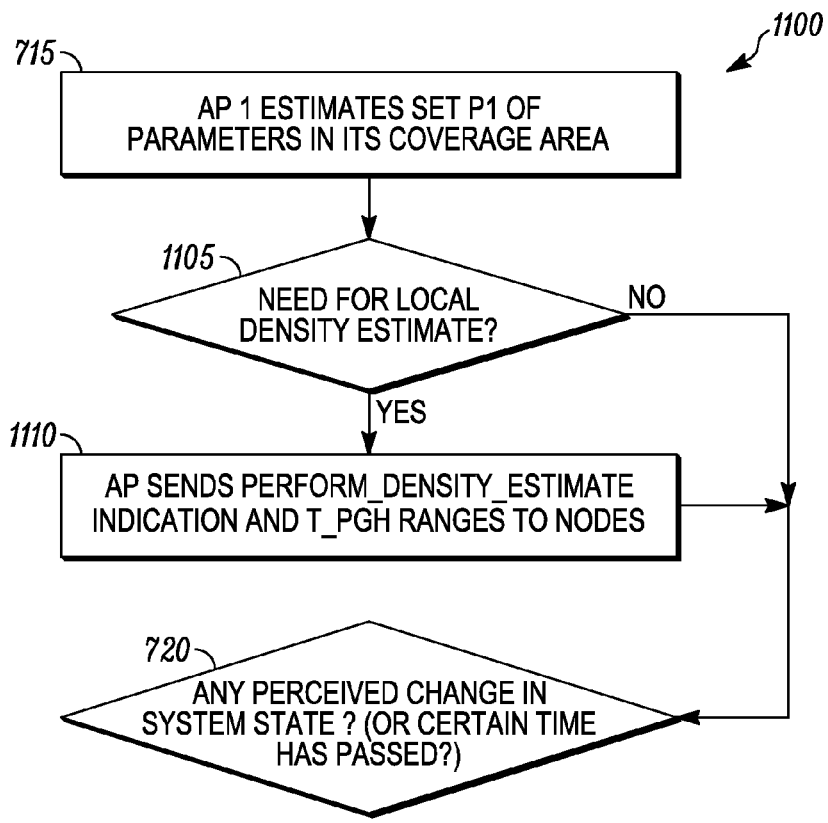
FIG. 11 is a flowchart illustrating an alternative operation of an access point within a wireless multihop communication network in accordance with some embodiments.

FIG. 11 is a flowchart illustrating an alternative operation of an access point within a wireless multihop communication network in accordance with some embodiments. Specifically, FIG. 11 illustrates a method of operation of an access point for non-uniform distribution. As illustrated, the operation of FIG. 11 adds a density estimate to the operation. Specifically, after Step 715 (ie. of FIG. 7), an additional step, Step 1105, is performed at the access point in which the access point determines whether or not there is a need for a local density estimate. When there is a need for a local density estimate, the operation continues to Step 1110 in which the access point, in addition to including the T_PGH information, the beacon can also carry a bit called PERFORM_DENSITY_ESTIMATE, which would indicate whether the AP is requesting standby nodes to perform node density estimation in their local neighborhood. Otherwise, and after Step 1110, the operation continues to Step 720 (i.e. of FIG. 7).

Figure 12:
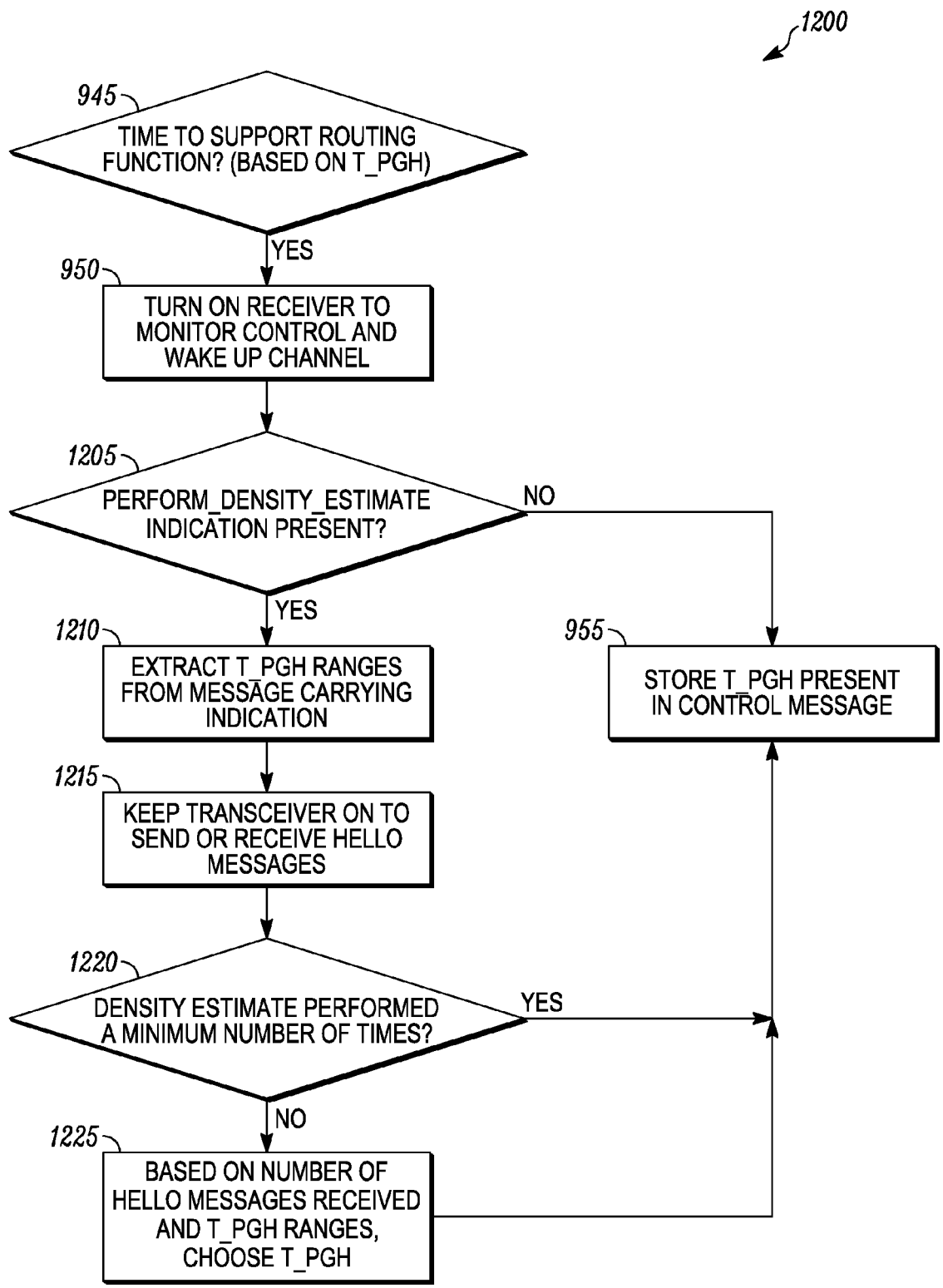
FIG. 12 is a flowchart illustrating an alternative operation of a node within a wireless multihop communication network in accordance with some embodiments.

FIG. 12 is a flowchart illustrating a method of operation 1200 of a node for non-uniform distribution in accordance with some embodiments. As illustrated, the operation of Steps 945 and 950 are completed (i.e. as described previously with regards to FIG. 9). Next, in Step 1205, the node determines if a PERFORM_DENSITY_ESTIMATE indication is present. When it is not present, the operation continues to Step 955 (i.e. as previously described with regards to FIG. 9). When the standby node receives a beacon with this bit set, the operation continues to Step 1210 in which the node extracts T_PGH ranges from the message carrying the indication. Next, in Step 1215, the node keeps the transceiver on to send or receive Hello messages. Next, in Step 1220, the node determines whether or not the density estimate has been performed a minimum number of times. When the density estimate has been performed a minimum number of times, the operation continues to Step 955. When it has not been performed a minimum number of times, the operation continues to Step 1225 in which based on the number of Hello messages received and the T_PGH ranges, the node chooses T_PGH. The operation then continues to Step 955.

In summary, when a standby node receives a beacon with the PERFORM_DENSITY_ESTIMATE indication, it wakes up as if someone has sent a message in the wake up channel and during its wake up period, the standby node would send a broadcast message containing its ID (similar to a "hello" message) and returns to sleep when the next beacon arrives. The bit PERFORM_DENSITY_ESTIMATE stays set for at least T_PGH consecutive beacons, allowing all standby nodes to exchange hello messages with their standby neighbors that wake up at the same wake up phase. This procedure allows all standby nodes to count how many standby nodes they have in their immediate neighborhood. Following the bit PERFORM_DENSITY_ESTIMATE, the beacon also contains information to allow standby nodes to adjust their T_PGH based on their individual neighbor count. This information may contain, for example, different neighbor count ranges followed by a T_PGH value specific to the range. Each standby node compares its neighbor count with each of the indicated ranges and adopts the corresponding T_PGH value. For example, the beacon could contain the following ranges, T_PGH values: {[0, 3], T_PGH=1}; {[4,7], T_PGH=2}; . . . ; {[20,30], T_PGH=10}; etc. Note that this method does not require nodes to send their individual neighbor counts to the AP. In order to minimize the impact of this procedure in the energy consumption of standby nodes, the AP would only trigger such procedure if it notices that the wake up control procedure is not being able to satisfy the connectivity requirements in spite of a high node density in the area, which could indicate that standby nodes may be concentrated in an area. The alternative embodiment of FIGS. 11 and 12 allow standby nodes to adjust their T_PGHs according to their situation in the non-uniform distribution.

Although the above described invention and its alternative embodiments focused on the need to control the wake up rate of standby nodes to support the connectivity of other nodes, the invention can be applied in the following situations: (a) Controlling the wake up rate of standby nodes to enable a multihop connection between two in-coverage nodes that are willing to communicate without transmitting to the AP. (b) Controlling the wake up rate of standby nodes to cooperate with active and other nodes to increase the probability of correct reception by the receiver, which may or may not be an AP. (c) Controlling the wake up rate of standby nodes to request information about their status. (d) Controlling the wake up rate of standby nodes to participate in sensing operations (i.e., to measure a certain quantity).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the tendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling a wake up rate of nodes operating within a multi-hop communication system, the method comprising:
    forming a group of access points comprising a plurality of access points within the multi-hop communication system;

at each of the plurality of access points:
  estimating a set of system parameters, wherein the one or more system parameters in the set of system parameters comprise one or more of a density of standby nodes, a density of active nodes, a measure of node mobility, a percentage of nodes that are out of communication range of the access point, a call generation rate, an average call duration, and a percentage of failed call generations and repairs in out of coverage regions;
  collecting and combining system parameters received from at least one of the plurality of access points in the group of access points with the estimated set of system parameters;
  processing and refining statistical information regarding the combined system parameters;
  determining the wake up rate based on the statistical information regarding the combined system parameters;
  transmitting the wake up rate to one or more nodes in a coverage area; and
at one or more nodes within the multi-hop communication system:
  receiving the wake up rate;
  periodically changing from a sleep state to a wake up state at the wake up rate to support routing functions for providing multi-hop communication to at least one or more of the plurality of access points.

2. The method as claimed in claim 1, further comprising at one of the one or more nodes within the multi-hop communication system after changing to the wake up state at the wake up rate:
  receiving a remain awake message; and
  participating in route/neighbor discovery procedures with at least one other node of the one or more nodes within the multi-hop communication system.

3. The method as claimed in claim 1, wherein transmitting the wake up rate to one or more nodes in the coverage area by each of the plurality of access points comprises:
  broadcasting the wake up rate to one or more active nodes, the method further comprising:
  propagating the wake up rate by the one or more active nodes in beacons transmitted to one or more standby nodes.

4. The method as claimed in claim 1, further comprising at each of the plurality of access points, prior to the estimating, collecting, processing, and refining statistical information:
  recording one or more events of a node registration, a node de-registration, a call generation in coverage, a call generation out of coverage, and a duration of calls.

5. The method as claimed in claim 1, further comprising at each of the plurality of access points:
  continuously estimating the percentage of nodes that are out of access point communication range.

6. The method as claimed in claim 1, wherein the estimating the set of system parameters includes:
  generating estimates for the call generation rate ($\lambda$), the average call duration ($\mu$) and a route repair rate ($\gamma$).

7. The method as claimed in claim 1, further comprising:
  identifying a location area in which each access point operates;
  determining by an access point one of a change in a system state and a predetermined period of time has passed;
  transmitting the one or more system parameters to one or more other access points operating in the location area; and
  at each access point receiving the system parameters:
    combining the received system parameters with previously received system parameters from other access points in the location area.

8. The method as claimed in claim 1, wherein each access point includes one of a lookup table and an analytical formula, wherein the determining the wake up rate comprises using the one of the look up table and an analytical formula to operate on the estimate of percentage of out of coverage nodes, the density of standby and active nodes, the call generation rate, a flow repair rate and an average flow duration.

9. The method as claimed in claim 8, wherein each access point changes the values of the lookup table or of the analytical formula based on the estimated probability of failed call setups and repairs.

10. The method as claimed in claim 1, further comprising:
  determining a first wake up rate to be used by a standby node in an area without active flows, and a second wake up rate to be used by a standby node when not in a route in an area with active flows in which the standby node can be considered for route repair.

11. The method as claimed in claim 10, wherein each access point includes a look up table for storing the first wake up rate and the second wake up rate, and further wherein each access point transmits the first wake up rate and the second wake up rate.

12. The method as claimed in claim 1, comprising:
  storing a location area identification information of another node;
  sending a registration request message to a closest access point;
  registering with the closest access point;
  storing a wake up phase and the wake up rate, wherein the wake up phase and the wake up rate are received in a registration response from the closest access point;
  initiating a standby operation mode in which the another node is a standby node;
  waking up to operate based on the wake up rate; and
  determining a wake up channel allocation to operate within according to the wake up phase independent of the wake up rate.

13. The method as claimed in claim 12, further comprising prior to the storing a location area identification step:
  receiving a location area identification (LAID) information of the access point within a beacon the another node;
  processing the received location area identification information of the closest access point including:
    updating the location area identification of the closest access point when the beacon is received from an Active Node, and
    updating the location area identification information of the closest access point when the last N beacons that carry LAID information contained the same location area identification information when the beacon is received from a Standby node, wherein N is a positive integer.

14. The method as claimed in claim 12, wherein the determining the wake up channel allocation to operate within follows a deterministic pattern.

15. The method as claimed in claim 12, wherein the determining the wake up channel allocation to operate within follows a probabilistically pattern using a probability given by one (1) divided by the wake up rate.

16. A method for controlling a wake up rate of nodes operating within a multi-hop communication system, the method comprising:

forming a group of access points comprising a plurality of access points within the multi-hop communication system;
at each of the plurality of access points:
  estimating a set of system parameters, wherein the one or more system parameters in the set of system parameters comprise one or more of a density of standby nodes, a density of active nodes, a measure of node mobility, a percentage of nodes that are out of communication range of the access point, a call generation rate, an average call duration, and a percentage of failed call generations and repairs in out of coverage regions;
  collecting and combining system parameters received from at least one of the plurality of access points in the group of access points with the estimated set of system parameters;
  processing and refining statistical information regarding the combined system parameters;
  determining a set of wake up rates based on the statistical information regarding the combined system parameters;
  transmitting the set of wake up rates to one or more nodes in a coverage area; and
  transmitting a bit indicating that nodes should perform an estimation of the density of nodes in its local area; and
at one or more nodes within the multi-hop communication system:
  receiving the set of wake up rates;
  receiving the bit indicating that local density estimation should be performed;
  performing the local density estimation through exchange of hello messages,
  stopping the local density estimation after the specified time;
  determining which of the wake up rates to use out of the received set of wake up rates based on the local density estimation; and
periodically changing from a sleep state to a wake up state at the chosen wake up rate to support routing functions for providing multi-hop communication to at least one or more of the plurality of access points.

17. The method as claimed in claim 1, further comprising sharing at least a subset of the combined system parameters with the group of access points.

* * * * *

UNITED STATES PATENT AND TRADEMARK OFFICE
CERTIFICATE OF CORRECTION

PATENT NO.        : 8,243,639 B2
APPLICATION NO.   : 12/038213
DATED             : August 14, 2012
INVENTOR(S)       : Fonseca, Jr. et al.

It is certified that error appears in the above-identified patent and that said Letters Patent is hereby corrected as shown below:

In Column 15, Line 48, delete "tendency" and insert -- pendency --, therefor.

In Column 18, Line 46, in Claim 13, delete "the access point" and insert -- the closest access point --, therefor.

Signed and Sealed this
Eighth Day of January, 2013

David J. Kappos
*Director of the United States Patent and Trademark Office*